(12) United States Patent
Li et al.

(10) Patent No.: US 12,060,291 B2
(45) Date of Patent: Aug. 13, 2024

(54) METHOD FOR TREATMENT AND RESOURCE UTILIZATION OF ACIDIC ORGANIC WASTEWATER

(71) Applicants: CHINA PETROLEUM & CHEMICAL CORPORATION, Beijing (CN); SINOPEC NANJING RESEARCH INSTITUTE OF CHEMICAL INDUSTRY CO., LTD, Nanjing (CN)

(72) Inventors: Haitao Li, Nanjing (CN); Songbai Mao, Nanjing (CN); Dong Wang, Nanjing (CN); Xi Chen, Nanjing (CN)

(73) Assignees: CHINA PETROLEUM & CHEMICAL CORPORATION, Beijing (CN); SINOPEC NANJING RESEARCH INSTITUTE OF CHEMICAL INDUSTRY CO., LTD., Beijing (CN)

( * ) Notice: Subject to any disclaimer, the term of this patent is extended or adjusted under 35 U.S.C. 154(b) by 504 days.

(21) Appl. No.: 17/285,969

(22) PCT Filed: Oct. 17, 2019

(86) PCT No.: PCT/CN2019/111721
§ 371 (c)(1),
(2) Date: Apr. 16, 2021

(87) PCT Pub. No.: WO2020/078433
PCT Pub. Date: Apr. 23, 2020

(65) Prior Publication Data
US 2021/0380452 A1 Dec. 9, 2021

(30) Foreign Application Priority Data
Oct. 18, 2018 (CN) .......................... 201811215345.3

(51) Int. Cl.
| | | |
|---|---|---|
| *C02F 9/00* | (2023.01) | |
| *C02F 1/32* | (2023.01) | |
| *C02F 3/12* | (2023.01) | |
| *C02F 3/32* | (2023.01) | |
| *C02F 3/34* | (2023.01) | |
| *C02F 101/34* | (2006.01) | |
| *C10B 53/02* | (2006.01) | |
| *C10L 3/08* | (2006.01) | |

(52) U.S. Cl.
CPC ............... C02F 9/00 (2013.01); C10B 53/02 (2013.01); C10L 3/08 (2013.01); *C02F 1/32* (2013.01); *C02F 3/12* (2013.01); *C02F 3/322* (2013.01); *C02F 3/341* (2013.01); *C02F 2101/34* (2013.01); *C02F 2209/22* (2013.01); *C02F 2303/10* (2013.01); *C02F 2305/06* (2013.01); *C10L 2200/0469* (2013.01)

(58) Field of Classification Search
None
See application file for complete search history.

(56) References Cited

U.S. PATENT DOCUMENTS

| | | | |
|---|---|---|---|
| 2014/0144839 A1 | 5/2014 | Choi et al. | |
| 2015/0125901 A1* | 5/2015 | Razavi-Shirazi | ....... C02F 3/348 |
| | | | 210/616 |

FOREIGN PATENT DOCUMENTS

| | | | |
|---|---|---|---|
| CN | 101376552 A | 3/2009 | |
| CN | 101654313 A | 2/2010 | |
| CN | 101767893 A | 7/2010 | |
| CN | 102311924 | 1/2012 | |
| CN | 102336498 A | 2/2012 | |
| CN | 102815839 A | 12/2012 | |
| CN | 103112993 A | 5/2013 | |
| CN | 104556544 A | 4/2015 | |
| CN | 104556545 A | 4/2015 | |
| CN | 105859034 A | 8/2016 | |
| CN | 105713934 | 12/2016 | |
| CN | 106186336 | 12/2016 | |
| CN | 106186554 A | 12/2016 | |
| CN | 107585870 | 1/2018 | |
| CN | 108585208 A | 9/2018 | |
| JP | H06269797 A | 9/1994 | |
| JP | 09-174088 * | 7/1997 | ............... C02F 3/34 |
| JP | H09174088 A | 7/1997 | |
| JP | H1052256 A | 2/1998 | |
| JP | 10-327848 * | 12/1998 | ............... C02F 3/34 |

(Continued)

OTHER PUBLICATIONS

Machine Translation of JP 09-174088 (Year: 1997).*

(Continued)

*Primary Examiner* — Benjamin M Kurtz
(74) *Attorney, Agent, or Firm* — Finnegan Henderson Farabow Garrett & Dunner LLP

(57) ABSTRACT

Disclosed is a method for the treatment and resource utilization of acidic organic wastewater, comprising: (1) performing activated sludge treatment on acidic organic wastewater; and (2) performing microalgae treatment on the acidic organic wastewater treated in step (1). By means of the combination of activated sludge treatment and microalgae treatment, the present invention can significantly reduce the COD of the acidic organic wastewater. In some embodiments, the use of acclimated activated sludge or activated sludge having a specific microbial flora structure can not only improve the treatment efficiency while shortening the treatment time, but also omit a pH value adjustment step without causing sludge accumulation.

20 Claims, No Drawings

(56) References Cited

FOREIGN PATENT DOCUMENTS

| JP | H10327848 A | 12/1998 |
|---|---|---|
| JP | 2015058387 A | 3/2015 |
| WO | WO2012153174 A2 | 11/2012 |

OTHER PUBLICATIONS

Machine Translation of JP 10-327848 (Year: 1998).*
Machine Translation of CN 104556545 (Year: 2015).*
International Search Report of International Application No. PCT/CN2019/111721, dated Dec. 31, 2019.

* cited by examiner

METHOD FOR TREATMENT AND RESOURCE UTILIZATION OF ACIDIC ORGANIC WASTEWATER

CROSS-REFERENCE TO RELATED APPLICATIONS

This application is a national stage filing under 35 U.S.C. § 371 of International Application No. PCT/CN2019/111721, filed Oct. 17, 2019, which claims the priority to and benefits of Chinese Patent Application No. 201811215345.3, filed Oct. 18, 2018, which is incorporated herein by reference in its entirety.

FIELD OF THE INVENTION

The present invention relates to the technical field of chemical engineering, and in particular, to a method for treatment and resource utilization of acidic organic wastewater.

BACKGROUND OF THE INVENTION $CO_2$ emission reduction is a major issue of climate change that the world faces today. It is a severe challenge for the industrial economy, especially the energy industry. The cost of emission reduction alone will have different impacts on the social, economic, and scientific and technological development of countries at different stages of development. The goal of the US Department of Energy is to gradually reduce the cost of $CO_2$ capture and sequestration (CCS) to no more than 20 USD/t-$CO_2$ or increase the cost of power generation by no more than 20%. The industrialized countries such as the United States and European countries are still working on it, but even if this goal can be achieved, developing countries including China may not be able to afford it.

With the continuous development of the national economy, the demand for petrochemicals is also increasing. The accompanying problem of wastewater discharge becomes more and more prominent, and the situation is getting more and more complicated. Biological water treatment technology, as a green chemical technology, has the characteristics of thorough wastewater treatment, low treatment cost, low chemical consumption and no secondary pollution, and it has become the mainstream technology of wastewater treatment currently. In this new type of water treatment technology, microalgae have the characteristics of fast growth rate, short harvest period, and high photosynthetic utilization efficiency. During the growth and reproduction process, organic compounds in the water body can be accumulated, absorbed and utilized as a nitrogen source and a sulfur source, and organic matters can also be used as an organic carbon source while $CO_2$ is used as an inorganic carbon source. After the microalgae treat the wastewater, a stage of performing thermal pyrolysis to the remaining microalgae ("algae mud") is added, and the microalgae is used as the raw material for producing a biomass gas, so as to realize resource utilization while avoiding the risk of secondary pollution to the environment caused by microalgae. The integration of a wastewater treatment stage and an energy production stage has great environmental protection significance and strategic significance of energy.

The document CN201710938493.7 discloses a method for treating sewage with microalgae. According to the method, metal ions in sewage are adsorbed by using a hollow adsorption column assembled by adsorption membranes prepared from modified chitosan and modified montmorillonite. The sewage is fed into the adsorption column under the action of negative pressure of a pump, is retained in the adsorption column, and contacts immobilized microalgae, and thus microalgae grow and reproduce by utilizing organic nutrient substances in the sewage. By adopting this method for treating sewage, substances such as metal ions, carbon, nitrogen and phosphorus in the sewage can be effectively removed, and meanwhile microalgae can be cultured on a large scale, so that dual purposes of sewage treatment and microalgae culture can be achieved. The treated sewage can be applied to irrigation, cultivation, cleaning and the like, and the cultured microalgae can be applied to aquaculture, feed addition, plant oil extraction and the like.

The document CN201610582744.8 discloses a microalgae optical biological sewage treatment device. Hydrogen peroxide can be generated through utilizing photosynthesis of a microalgae biological film, and the hydrogen peroxide is converted into a hydroxyl free radical under an illumination condition through a photochemical reaction, so that the microalgae sewage treatment effect is improved very well. The document CN201410731223.5 discloses a method for producing microalgae oil. The method comprises the following steps: adding a microalgae culture medium and a mixed microalgae seed solution to a photobioreactor, keeping the pH value of a culture system to be from 8 to 12, and introducing a gas which contains 5 v % to 45 v % of $CO_2$ by volume. The solubility and the tolerance of the microalgae culture system to the high-concentration $CO_2$ are improved; the carbon sequestration efficiency is improved; and the yield of the microalgae oil is significantly improved, and the obtained microalgae oil can be used for producing biodiesel.

The document CN201010222051.0 discloses a method for open-type culture of microalgae. $CO_2$ is supplied into an illumination open-type bioreactor which contains microalgae and a microalga culture medium for the growth of microalgae. The $CO_2$ is supplied by a method which is to mix a $CO_2$-containing gas with a liquid phase by using a gas-liquid mixed conveying device, perform gas-liquid separation in a gas-liquid separator, and deliver a $CO_2$-dissolving liquid phase obtained after gas-liquid separation to the open-type bioreactor to supply the $CO_2$ required by the growth of the microalgae.

The document CN105859034A discloses a method for treating high-COD and high-concentration organic salt acid organic chemical wastewater. The method includes the steps of: S1, sequentially adding hydrogen peroxide, ferrous sulfate, $Ca(OH)_2$ and $Na_2CO_3$ into the wastewater, stirring to adjust the pH to range from 6.5 to 8.5, standing for 1 h, then removing precipitation, and discharging the organic chemical wastewater into a settling tank; S2, adding a molecular sieve into the wastewater obtained in S1, stirring, standing for 1 h, then removing precipitation, and discharging supernate into an anaerobic reactor; S3, maintaining the temperature of the supernate obtained in S2 in a range from 15° C. to 35° C., adding nitrogen and phosphorus sources according to the ratio of COD to N to P being 450:5:1, adjusting the pH to range from 7.5 to 8.5, adding sulfate reducing microflora to perform anaerobic treatment, performing hydraulic retention for 24 h, and then conveying obtained supernate into an aerobic reactor; S4, maintaining the temperature of the supernate obtained in the S3 in a range from 20° C. to 35° C., adding nitrogen and phosphorus sources according to the ratio of COD to N to P being 250:5:1, adjusting the pH to range from 6.5 to 8, adding halophilic microflora and halotolerant microflora to perform first aerobic treatment, performing aeration stirring, performing hydraulic retention for 24 h, performing second aerobic treatment, performing aeration stirring, and performing hydraulic retention for 24 h; and S5, precipitating and discharging supernate. This wastewater treatment process is complicated and time-consuming, needs adjustment of the pH, and consumes a great amount of alkaline liquor.

SUMMARY OF THE INVENTION

Directed against the deficiencies in existing technologies, the present invention provides, at a first aspect, a method for treatment and resource utilization of acidic organic wastewater.

The method for treatment and resource utilization of acidic organic wastewater includes the following steps of:
(1) performing activated sludge treatment on acidic organic wastewater; and
(2) performing microalgae treatment on the acidic organic wastewater treated in step (1).

By means of the combination of activated sludge treatment and microalgae treatment, the present invention can significantly reduce a COD value of the acidic organic wastewater.

According to some embodiments of the present invention, the acidic organic wastewater is terephthalic acid wastewater.

According to some embodiments of the present invention, the acidic organic wastewater before the treatment in step (1) has a CODcr value of 3000-30000 mg/L.

According to some embodiments of the present invention, the acidic organic wastewater has a pH value of 1-5.

In some embodiments, the activated sludge is selected from aerobic activated sludge.

According to some embodiments of the present invention, the activated sludge used in step (1) is activated sludge acclimated from activated sludge used for municipal sewage. The activated sludge used for treatment of municipal sewage cannot adapt to an acidic environment of the wastewater. When the activated sludge used for treatment of municipal sewage is used for treatment of acidic organic wastewater, it is required to additionally add alkali to adjust the pH until the pH is neutral, and a COD removal rate is low.

According to some embodiments of the present invention, microbes in the activated sludge used for municipal sewage include Sphingobacteriia from 20% to 25%, Betaproteobacteria from 20% to 25%, Gammaproteobacteria from 15% to 20%, and Clostridia from 10% to 15%. It can be easily understood by those skilled in the art that, in the context of the present invention, each of the above percentages concerning a microbial flora structure refers to bacterial abundance, i.e., a ratio of the number of genes of a certain bacterium to the total number of genes.

In a specific embodiment, microbes in the activated sludge used for municipal sewage include 22.83%±1% of Sphingobacteriia, 22.62%±1% of Betaproteobacteria, 17.76%±1% of Gammaproteobacteria, and 11.57%±1% of Clostridia.

According to some embodiments of the present invention, microbes in the activated sludge used in step (1) include Chlorobia, a content of which accounts for more than 10%, preferably more than 15%, and more preferably 20%-25% of the total microbes.

According to some embodiments of the present invention, microbes in the activated sludge used in step (1) include Alphaproteobacteria, Sphingobacteriia, Betaproteobacteria, and Chlorobia, a total content of which accounts for more than 50%, preferably more than 60%, and more preferably more than 70% of the total microbes. These four bacteria are dominant bacteria, and are the top four types of bacteria with the highest contents in a microbial flora structure of the activated sludge used in step (1).

According to some embodiments of the present invention, microbes in the activated sludge used in step (1) include Alphaproteobacteria from 15% to 25%, Sphingobacteriia from 10% to 15%, Betaproteobacteria from 15% to 25%, and Chlorobia from 20% to 25%, and preferably include Alphaproteobacteria from 20% to 22%, Sphingobacteriia from 11% to 13%, Betaproteobacteria from 18% to 21%, and Chlorobia from 21% to 25%.

Using the activated sludge in the above embodiments for treatment of acidic organic wastewater has the following advantages: the activated sludge has a very strong adaptation to a load variation of the wastewater and can self-adjust a pH value until the pH value is neutral in the treatment process, and thus there is no need to additionally add alkali to adjust the pH in the treatment process. Besides, the sludge can be used continuously, and the volume of the activated sludge does not accumulate.

According to some embodiments of the present invention, microbes in the activated sludge used in step (1) include 35.90%±1% of Alphaproteobacteria, 23.83%±1% of Sphingobacteriia, and 9.97%±1% of Deinococci.

According to some specific embodiments of the present invention, microbes in the activated sludge used in step (1) include 21.59%±1% of Alphaproteobacteria, 12.68%±1% of Sphingobacteriia, 19.15%±1% of Betaproteobacteria, and 23.26%±1% of Chlorobia.

According to some embodiments of the present invention, microbes in the activated sludge used in step (1) include Alphaproteobacteria, Sphingobacteriia, and Deinococci.

According to some embodiments of the present invention, in the activated sludge used in step (1), a total content of Alphaproteobacteria, Sphingobacteriia, and Deinococci accounts for more than 50%, preferably more than 60%, and more preferably more than 70% of the total microbes.

According to some embodiments of the present invention, microbes in the activated sludge used in step (1) include Alphaproteobacteria from 30% to 40%, Sphingobacteriia from 20% to 25%, and Deinococci from 8% to 12%.

According to some embodiments of the present invention, microbes in the activated sludge include Alphaproteobacteria from 33% to 36%, Sphingobacteriia from 22% to 24%, and Deinococci from 9% to 10%.

According to some preferred embodiments of the present invention, a method of acclimating the activated sludge includes a first acclimating stage, in which activated sludge used for treatment of municipal sewage is cultivated for 8 to 10 days with acidic wastewater having a CODcr value of 3000-5000 mg/L and a pH value of 1-5.

Preferably, at the first acclimating stage, a cultivating temperature ranges from 20 to 28° C., and a dissolved oxygen content is controlled from 1 to 5 mg/L.

According to some more preferred embodiments of the present invention, the method of acclimating the activated sludge further includes a second acclimating stage after the first acclimating stage. At the second acclimating stage, acidic organic wastewater having a COD value of 6000-8000 mg/L, acidic organic wastewater having a COD value of 9000-15000 mg/L, and acidic organic wastewater having a COD value of 16000-30000 mg/L are used sequentially to cultivate the activated sludge after the first acclimating stage, and cultivating time all range from 1 to 3 days.

Preferably, during the second acclimating stage, N and P nutrient substances are added. A nitrogen source is provided by carbamide, and a phosphorus source is provided by dipotassium phosphate. A ratio of a COD value to N to P is (95-102):(0.8-1.3):(0.7-1.2). The COD value indicates a COD value of the wastewater used at the second acclimating stage, and N and P are measured in element mass.

Preferably, at the second acclimating stage, cultivating temperatures all range from 20 to 28° C., and a dissolved oxygen content is controlled from 2 to 4 mg/L.

According to some embodiments of the present invention, time of the activated sludge treatment ranges from 5 to 96 h, preferably from 5 to 48 h. According to some preferred embodiments, time of the activated sludge treatment ranges from 2 to 6 h, for example from 3 to 5 h.

Using the activated sludge in the present invention for treatment of acidic organic wastewater has the following advantages: the activated sludge has a very strong adaptation to a load variation of the wastewater and can self-adjust a pH value until the pH value is neutral in the treatment process, and thus there is no need to additionally add alkali to adjust the pH in the treatment process. Besides, the acclimated sludge can be used continuously, and the volume of the activated sludge does not accumulate.

When an ordinary activated sludge, such as the activated sludge used for treatment of municipal sewage, is used, since the activated sludge cannot adapt to an acidic environment of the wastewater, it is required to additionally add alkali to adjust the pH until the pH is neutral, and a COD removal rate is low.

According to some embodiments of the present invention, microalgae used in the microalgae treatment are *Chlorella*. Preferably, before use, acclimating treatment is performed on the microalgae in a photobiological device. Conditions of the acclimating treatment on the microalgae are preferably cultivating the microalgae for 10 days to 16 days with acidic organic wastewater to be treated and meanwhile providing illumination preferably with an illumination intensity from 3000 to 4100 lux.

According to some embodiments of the present invention, time of the microalgae treatment ranges from 5 to 240 h, preferably from 12 to 36 h. According to some preferred embodiments, time of the microalgae treatment ranges from 15 to 22 h, for example from 18 to 20 h.

According to some embodiments of the present invention, the method further includes performing ultraviolet irradiation treatment on the acidic organic wastewater before the activated sludge treatment. Preferably, time of the ultraviolet irradiation treatment ranges from 4 to 500 min, more preferably from 5 to 60 min.

According to some embodiments of the present invention, the method further includes using carbon dioxide in an industrial purge gas and/or in a biomass gas source as a carbon source for growth of the microalgae. Preferably, the industrial purge gas is a flue gas. A content of carbon dioxide in the flue gas may range from 8 to 15 v %, preferably 10 to 12.5 v %. During the microalgae treatment, a capture rate of carbon dioxide may be more than 90%.

According to some embodiments of the present invention, after the microalgae treatment, the acidic organic wastewater has a COD value of less than 300 mg/L.

According to some embodiments of the present invention, the method further includes recycling microalgae used in the microalgae treatment as a biomass energy material for producing a biomass fuel gas by pyrolysis.

The present invention provides, at a second aspect, a method for acclimating activated sludge, which includes:

a first acclimating stage, in which activated sludge used for treatment of municipal sewage is cultivated for 8 to 10 days with acidic wastewater having a COD value of 3000-5000 mg/L and a pH value of 1-5.

Preferably, at the first acclimating stage, a cultivating temperature ranges from 20 to 28° C., and a dissolved oxygen content is controlled from 2 to 4 mg/L.

According to some more preferred embodiments of the present invention, the method further includes a second acclimating stage after the first acclimating stage. At the second acclimating stage, acidic organic wastewater having a COD value of 6000-8000 mg/L, acidic organic wastewater having a COD value of 9000-15000 mg/L, and acidic organic wastewater having a COD value of 16000-30000 mg/L are used sequentially to cultivate the activated sludge after the first acclimating stage, and cultivating time all range from 1 to 3 days. Preferably, during the second acclimating stage, N and P nutrient substances are added. A nitrogen source is provided by carbamide, and a phosphorus source is provided by dipotassium phosphate. A ratio of COD to N to P is (95-102):(0.8-1.3):(0.7-1.2). The COD indicates a COD value of the wastewater used at the second acclimating stage, and N and P are measured in element mass.

Preferably, at the second acclimating stage, cultivating temperatures all range from 20 to 28° C., and a dissolved oxygen content is controlled from 2 to 4 mg/L.

The present invention provides, at a third aspect, an activated sludge suitable for treatment of acidic organic wastewater. Microbes in the activated sludge include Alphaproteobacteria, Sphingobacteriia, Betaproteobacteria, and Chlorobia, a total content of which accounts for more than 50%, preferably more than 60%, and more preferably more than 70% of the total microbes.

According to some embodiments of the present invention, microbes in the activated sludge include Alphaproteobacteria from 15% to 25%, Sphingobacteriia from 10% to 15%, Betaproteobacteria from 15% to 25%, and Chlorobia from 20% to 25%. Preferably, microbes in the activated sludge include Alphaproteobacteria from 20% to 22%, Sphingobacteriia from 11% to 13%, Betaproteobacteria from 18% to 21%, and Chlorobia from 21% to 25%.

According to some embodiments of the present invention, microbes in the activated sludge include Alphaproteobacteria, Sphingobacteriia, Betaproteobacteria, and Chlorobia, a total content of which accounts for more than 50%, preferably more than 60%, and more preferably more than 70% of the total microbes.

According to some embodiments of the present invention, microbes in the activated sludge include Alphaproteobacteria from 15% to 25%, Sphingobacteriia from 10% to 15%, Betaproteobacteria from 15% to 25%, and Chlorobia from 20% to 25%, and preferably include Alphaproteobacteria from 20% to 22%, Sphingobacteriia from 11% to 13%, Betaproteobacteria from 18% to 21%, and Chlorobia from 21% to 25%.

According to some embodiments of the present invention, microbes in the activated sludge include Chlorobia, a content of which accounts for more than 10%, preferably more than 15%, and more preferably 20%-25% of the total microbes.

According to some embodiments of the present invention, microbes in the activated sludge include Alphaproteobacteria, Sphingobacteriia, and Deinococci.

According to some embodiments of the present invention, a total content of Alphaproteobacteria, Sphingobacteriia, and Deinococci accounts for more than 50%, preferably more than 60%, and more preferably more than 70% of the total microbes.

According to some embodiments of the present invention, microbes in the activated sludge include Alphaproteobacteria from 30% to 40%, Sphingobacteriia from 20% to 25%, and Deinococci from 8% to 12%.

According to some embodiments of the present invention, microbes in the activated sludge include Alphaproteobacteria from 33% to 36%, Sphingobacteriia from 22% to 24%, and Deinococci from 9% to 10%. According to some specific embodiments of the present invention, microbes in the activated sludge include 35.90%±1% of Alphaproteobacteria, 23.83%±1% of Sphingobacteriia, and 9.97%±1% of Deinococci.

According to some specific embodiments of the present invention, microbes in the activated sludge include 21.59%±1% of Alphaproteobacteria, 12.68%±1% of Sphingobacteriia, 19.15%±1% of Betaproteobacteria, and 23.26%±1% of Chlorobia.

According to some embodiments of the present invention, dominant bacteria of the microbes in the activated sludge are Alphaproteobacteria, Sphingobacteriia, Betaproteobacteria, and Chlorobia, and proportions thereof respectively range from 21% to 22%, from 12% to 13%, from 19% to 20%, and from 23% to 24%. More specifically, in some embodiments of the present invention, dominant bacteria of the microbes in the activated sludge are Alphaproteobacteria, Sphingobacteriia, Betaproteobacteria, and Chlorobia, and proportions thereof respectively are 21.59%, 12.68%, 19.15%, and 23.26%.

In the above embodiments, the activated sludge has the following advantages: the activated sludge has a very strong adaptation to a load variation of the acidic organic wastewater; the volume of the activated sludge does not accumulate; and the activated sludge can self-adjust a pH value until the pH value is neutral in the treatment process.

The present invention provides, at a fourth aspect, use of the activated sludge according to the second aspect and/or the third aspect of the present invention in treatment of organic wastewater, especially acidic organic wastewater. In some embodiments, the acidic organic wastewater is terephthalic acid wastewater. In some embodiment, the acidic organic wastewater has a pH value of 1-5.

In the present application, the term "terephthalic acid wastewater" refers to wastewater discharged during production of terephthalic acid, and the main pollutants are terephthalic acid, acetic acid, benzoic acid, and so on.

According to some embodiments, the method for the treatment and resource utilization of acidic organic wastewater provided in the present invention uses technologies of acidic organic wastewater treatment and microalgae culture using carbon dioxide in the flue gas to treat PTA wastewater with $CO_2$ and residual heat in the flue gas and meanwhile perform microalgae biomass gasification. Developing a technology of industrially utilizing carbon dioxide in the flue gas, which purifies wastewater and generates a byproduct of biomass energy at the same time, so as to use one waste to reduce generation of another waste and change a waste to a resource conforms to the current objects of green chemical engineering and circular economy, which has great economic value and social significance. In addition, the method of the present invention solves the problem of low $CO_2$ utilization rate in the existing open-type microalgae culture system caused by thin liquid layer, improves the ability of microalgae to accumulate oil during microalgae culture, improves the $CO_2$ utilization rate, and simplifies the culture device.

DETAILED DESCRIPTION OF THE EMBODIMENTS

In order to make technical solutions of the present invention better understood, the present invention will be described in detail below in conjunction with embodiments. These embodiments are only illustrative and are not limited to the scope of application of the present invention.

I. Activated Sludge

1. Process of Acclimating Microbes

Activated sludge from municipal sewage treatment works is taken and placed in an aerobic reactor in a laboratory for acclimating treatment. The whole acclimating process includes two stages. At a first stage (preliminary acclimating), activated sludge is cultivated for 8 to 10 days with diluted terephthalic acid wastewater (having a COD concentration of 3000-5000 mg/L and a pH value of 4) to obtain preliminarily acclimated activated sludge. At a second stage (deep acclimating), the preliminarily acclimated activated sludge is further cultivated with diluted terephthalic acid wastewater for 6 to 9 days in total. During the $1^{st}$ day to the $3^{rd}$ day, diluted terephthalic acid wastewater having a COD of 6000-8000 mg/L is used for culture; during the $4^{th}$ day to the $6^{th}$ day, diluted terephthalic acid wastewater having a COD of 9000-15000 mg/L is used for culture; and during the $7^{th}$ day to the $9^{th}$ day, diluted terephthalic acid wastewater having a COD of 16000-30000 mg/L is used for culture. In the process of deep acclimating, N and P nutrient substances are added. A nitrogen source is provided by carbamide, and a phosphorus source is provided by dipotassium phosphate. A ratio of COD to N to P is (95-102):(0.8-1.3):(0.7-1.2). Cultivating temperatures at the first acclimating stage and the second acclimating stage all range from 20 to 28° C., and a dissolved oxygen content is controlled from 2 to 4 mg/L.

2. Analysis and Characterization of a Microbial Flora Structure

Measurement of species and contents of respective microbes in the activated sludge: a sample of the activated sludge is collected for DNA extraction, PCR amplification, and Illumina Miseq sequencing, so as to analyze and determine species and contents (abundance) based on the obtained sequencing result.

Microbes in the activated sludge before acclimating mainly include Sphingobacteriia (22.83%), Betaproteobacteria (22.62%), Gammaproteobacteria (17.76%), and Clostridia (11.57%).

Microbes in the activated sludge after the preliminary acclimating mainly include Alphaproteobacteria (35.90%), Sphingobacteriia (23.83%), and Deinococci (9.97%). This results shows that there is a relatively great change in the structure of the major flora.

After the deep acclimating, Alphaproteobacteria and Sphingobacteriia are still dominant bacteria, but proportions thereof respectively reduce from 35.90% and 23.83% obtained at the preliminary acclimating to 21.59% and 12.68%. Besides, proportions of Betaproteobacteria and Chlorobia increase significantly, i.e., from 8.12% and 0.35% to 19.15% and 23.26%.

An observed yield Yobs value of the activated sludge is detected (Yobs=sludge increasing amount/COD consumption amount (mg MLSS/mg COD)). At the first acclimating stage, the Yobs value ranges from 0.02 to 0.05 g MLSS/g COD, and at the second acclimating stage, the Yobs value ranges from 0.04 to 0.06 g MLSS/g COD. This shows that, after the preliminary acclimating and deep acclimating, the microbial flora structure in the activated sludge is optimized, and a dynamic balance of adaptive growth and endogenous consumption is achieved. Thus, the activated sludge does not accumulate.

In addition, the acclimated activated sludge is able to make the pH rise after treatment of acidic wastewater, and this is a characteristic of the acclimated activated sludge in the present invention.

In short, the acclimated activated sludge in the present invention has a very strong adaptation to a load variation of PTA wastewater; the volume of the activated sludge does not accumulate; and the acclimated activated sludge can self-adjust a pH value until the pH value is neutral in the treatment process.

II. Microalgae

For the microalgae, *Chlorella*, a common algae species in freshwater, is adopted. The microalgae are placed in a photobiological device in a laboratory for acclimating treatment. The microalgae are cultivated for 10 to 16 days with wastewater to be treated (terephthalic acid wastewater) at a temperature from 20 to 28° C., and meanwhile certain illumination with an illumination intensity from 3000 to 4100 lux is provided each day.

Example 1

A discharge amount of a sewage source containing PTA wastewater is 4 tons per day. The PTA wastewater has a CODcr content of 20000 mg/L, a temperature of 40° C., and a pH value of 4. The method provided in the present invention was used for treatment. First, ultraviolet light irradiation treatment was performed by using ultraviolet light having a wavelength of 365 nm to decompose PTA molecules. Then, activated sludge (the activated sludge after the above-mentioned deep acclimating was used) pretreatment was performed. After the activated sludge treatment, the wastewater had a pH value of 5.8 and a CODcr content of 1809 mg/L. After that, a water sample was put in a microalgae pond for microalgae (chlorella) treatment, and at the same time, a flue gas with a carbon dioxide content of 12 v % was introduced to supply carbon dioxide for microalgae production. After a total treatment residence time of 24 h (including 10 min of ultraviolet light irradiation treatment, 8 h of activated sludge treatment, and 15.83 h of microalgae treatment), the PTA wastewater had a CODcr content of 128 mg/L, and a capture rate of carbon dioxide in the flue gas reached 91%. The microalgae in the reactor were replaced regularly and used for producing a fuel gas by pyrolysis.

Comparative Example 1

The wastewater containing PTA and the condition of the flue gas were the same as those in Example 1. The difference lies in that a conventional activated sludge method was used for treatment. After the above-mentioned activated sludge from municipal sewage treatment works and wastewater to be treated were fully mixed, aeration was performed. Since the wastewater had a pH value of 4 and active ingredients in the sludge could not survive, the wastewater containing PTA could not be treated with the conventional method. The wastewater containing PTA could only be treated after being neutralized and diluted, and a treatment period was 48 h. After the treatment, the wastewater had a CODcr content of 1000 mg/L.

Example 2

A discharge amount of a sewage source containing PTA wastewater is 40 tons per day. The PTA wastewater has a CODcr content of 15000 mg/L, a temperature of 40° C., and a pH value of 4.4. The method provided in the present invention was used for treatment. First, ultraviolet light irradiation treatment was performed by using ultraviolet light having a wavelength of 365 nm to decompose PTA molecules. Then, activated sludge pretreatment was performed. After that, a water sample was put in a microalgae pond for microalgae treatment, and at the same time, a flue gas with a carbon dioxide content of 8 v % was introduced to supply carbon dioxide for microalgae production. After a total treatment residence time of 20 h (including 15 min of ultraviolet light irradiation treatment, 6.75 h of activated sludge treatment, and 13 h of microalgae treatment), the PTA wastewater had a CODcr content of 107 mg/L, and a capture rate of carbon dioxide in the flue gas reached 90.8%. The microalgae in the reactor were replaced regularly and used for producing a fuel gas by pyrolysis.

Comparative Example 2

The wastewater containing PTA and the condition of the flue gas were the same as those in Example 2. The difference lies in that a conventional activated sludge method was used for treatment. After the above-mentioned activated sludge from municipal sewage treatment works and wastewater to be treated were fully mixed, aeration was performed. Since the wastewater had a pH value of 4.4 and active ingredients in the sludge could not survive, the wastewater containing PTA could not be treated with the conventional method. The wastewater containing PTA could only be treated after being neutralized and diluted, and a treatment period was 48 h. After the treatment, the wastewater had a CODcr content of 1000 mg/L.

Example 3

A discharge amount of a sewage source containing PTA wastewater is 10 tons per day. The PTA wastewater has a CODcr content of 30000 mg/L, a temperature of 45° C., and a pH value of 3.8. The method provided in the present invention was used for treatment. First, ultraviolet light irradiation treatment was performed by using ultraviolet light having a wavelength of 365 nm to decompose PTA molecules. Then, activated sludge pretreatment was performed. After the activated sludge treatment, the wastewater had a pH value of 6.1 and a CODcr content of 2910 mg/L. After that, a water sample was put in a microalgae pond for microalgae treatment, and at the same time, a flue gas with a carbon dioxide content of 15 v % was introduced to supply carbon dioxide for microalgae production. After a total treatment residence time of 28 h (including 6 min of ultraviolet light irradiation treatment, 13 h of activated sludge treatment, and 14.9 h of microalgae treatment), the PTA wastewater had a CODcr content of 159 mg/L, and a capture rate of carbon dioxide in the flue gas reached 91.5%. The microalgae in the reactor were replaced regularly and used for producing a fuel gas by pyrolysis.

Comparative Example 3

The wastewater containing PTA and the condition of the flue gas were the same as those in Example 3. The difference lies in that a conventional activated sludge method was used for treatment. After the above-mentioned activated sludge from municipal sewage treatment works and wastewater to be treated were fully mixed, aeration was performed. Since the wastewater had a pH value of 3.8 and active ingredients in the sludge could not survive, the wastewater containing PTA could not be treated with the conventional method. The wastewater containing PTA could only be treated after being neutralized and diluted, and a treatment period was 60 h. After the treatment, the wastewater had a CODcr content of 1200 mg/L.

Example 4

A discharge amount of a sewage source containing PTA wastewater is 1 ton per day. The PTA wastewater has a CODcr content of 10000 mg/L, a temperature of 35° C., and a pH value of 4.8. The method provided in the present invention was used for treatment. First, ultraviolet light irradiation treatment was performed by using ultraviolet light having a wavelength of 365 nm to decompose PTA molecules. Then, activated sludge pretreatment was performed. After the activated sludge treatment, the wastewater had a pH value of 5.98 and a CODcr content of 1851 mg/L. After that, a water sample was put in a microalgae pond for microalgae treatment, and at the same time, a flue gas with a carbon dioxide content of 12 v % was introduced to supply carbon dioxide for microalgae production. After a total treatment residence time of 22 h (including 4 min of ultraviolet light irradiation treatment, 9 h of activated sludge treatment, and 12.93 h of microalgae treatment), the PTA wastewater had a CODcr content of 89 mg/L, and a capture rate of carbon dioxide in the flue gas reached 93.5%. The microalgae in the reactor were replaced regularly and used for producing a fuel gas by pyrolysis.

Comparative Example 4

The wastewater containing PTA and the condition of the flue gas were the same as those in Example 4. The difference lies in that a conventional activated sludge method was used for treatment. After the above-mentioned activated sludge from municipal sewage treatment works and wastewater to be treated were fully mixed, aeration was performed. Since the wastewater had a pH value of 4.8 and active ingredients in the sludge could not survive, the wastewater containing PTA could not be treated with the conventional method. The wastewater containing PTA could only be treated after being neutralized and diluted, and a treatment period was 40 h. After the treatment, the wastewater had a CODcr content of 700 mg/L.

Example 5

A discharge amount of a sewage source containing PTA wastewater is 80 tons per day. The PTA wastewater has a CODcr content of 17000 mg/L, a temperature of 45° C., and a pH value of 4.5. The method provided in the present invention was used for treatment. First, ultraviolet light irradiation treatment was performed by using ultraviolet light having a wavelength of 365 nm to decompose PTA molecules. Then, activated sludge pretreatment was performed. After the activated sludge treatment, the wastewater had a pH value of 6.02 and a CODcr content of 2080 mg/L. After that, a water sample was put in a microalgae pond for microalgae treatment, and at the same time, a flue gas with a carbon dioxide content of 10 v % was introduced to supply carbon dioxide for microalgae production. After a total treatment residence time of 28 h (including 40 min of ultraviolet light irradiation treatment, 10 h of activated sludge treatment, and 17.33 h of microalgae treatment), the PTA wastewater had a CODcr content of 129 mg/L, and a capture rate of carbon dioxide in the flue gas reached 90.5%. The microalgae in the reactor were replaced regularly and used for producing a fuel gas by pyrolysis.

Comparative Example 5

The wastewater containing PTA and the condition of the flue gas were the same as those in Example 5. The difference lies in that a conventional activated sludge method was used for treatment. After the above-mentioned activated sludge from municipal sewage treatment works and wastewater to be treated were fully mixed, aeration was performed. Since the wastewater had a pH value of 4.5 and active ingredients in the sludge could not survive, the wastewater containing PTA could not be treated with the conventional method. The wastewater containing PTA could only be treated after being neutralized and diluted, and a treatment period was 36 h. After the treatment, the wastewater had a CODcr content of 1300 mg/L.

Example 6

A discharge amount of a sewage source containing PTA wastewater is 30 tons per day. The PTA wastewater has a CODcr content of 23000 mg/L, a temperature of 40° C., and a pH value of 4.2. The method provided in the present invention was used for treatment. First, ultraviolet light irradiation treatment was performed by using ultraviolet light having a wavelength of 365 nm to decompose PTA molecules. Then, activated sludge pretreatment was performed. After the activated sludge treatment, the wastewater had a pH value of 5.95 and a CODcr content of 4810 mg/L. After that, a water sample was put in a microalgae pond for microalgae treatment, and at the same time, a flue gas with a carbon dioxide content of 12.5 v % was introduced to supply carbon dioxide for microalgae production. After a total treatment residence time of 30 h (including 12 min of ultraviolet light irradiation treatment, 10 h of activated sludge treatment, and 19.8 h of microalgae treatment), the PTA wastewater had a CODcr content of 179 mg/L, and a capture rate of carbon dioxide in the flue gas reached 91.3%. The microalgae in the reactor were replaced regularly and used for producing a fuel gas by pyrolysis.

Comparative Example 6

The wastewater containing PTA and the condition of the flue gas were the same as those in Example 6. The difference lies in that a conventional activated sludge method was used for treatment. After the above-mentioned activated sludge from municipal sewage treatment works and wastewater to be treated were fully mixed, aeration was performed. Since the wastewater had a pH value of 4.2 and active ingredients in the sludge could not survive, the wastewater containing PTA could not be treated with the conventional method. The wastewater containing PTA could only be treated after being neutralized and diluted, and a treatment period was 42 h. After the treatment, the wastewater had a CODcr content of 1500 mg/L.

Example 7

A discharge amount of a sewage source containing PTA wastewater is 15 tons per day. The PTA wastewater has a CODcr content of 29000 mg/L, a temperature of 40° C., and a pH value of 3.9. The method provided in the present invention was used for treatment. First, ultraviolet light irradiation treatment was performed by using ultraviolet light having a wavelength of 365 nm to decompose PTA molecules. Then, activated sludge pretreatment was performed. After the activated sludge treatment, the wastewater had a pH value of 5.89 and a CODcr content of 3284 mg/L. After that, a water sample was put in a microalgae pond for microalgae treatment, and at the same time, a flue gas with a carbon dioxide content of 12 v % was introduced to supply carbon dioxide for microalgae production. After a total treatment residence time of 30 h (including 10 min of ultraviolet light irradiation treatment, 8 h of activated sludge treatment, and 21.83 h of microalgae treatment), the PTA wastewater had a CODcr content of 209 mg/L, and a capture rate of carbon dioxide in the flue gas reached 90.3%. The microalgae in the reactor were replaced regularly and used for producing a fuel gas by pyrolysis.

Comparative Example 7

The wastewater containing PTA and the condition of the flue gas were the same as those in Example 7. The difference lies in that a conventional activated sludge method was used for treatment. After the above-mentioned activated sludge from municipal sewage treatment works and wastewater to be treated were fully mixed, aeration was performed. Since the wastewater had a pH value of 3.9 and active ingredients in the sludge could not survive, the wastewater containing PTA could not be treated with the conventional method. The wastewater containing PTA could only be treated after being neutralized and diluted, and a treatment period was 45 h. After the treatment, the wastewater had a CODcr content of 1700 mg/L.

Example 8

The wastewater used and treatment steps were basically the same as those in Example 1. The difference only lies in that activated sludge which is not acclimated, i.e., the activated sludge from municipal sewage treatment works, was used in the step of activated sludge pretreatment.

After the treatments, the PTA wastewater had a CODcr content of 11000 mg/L, and a capture rate of carbon dioxide in the flue gas reached 5%. The microalgae in the reactor were replaced regularly and used for producing a fuel gas by pyrolysis.

Example 9

The wastewater used and treatment steps were basically the same as those in Example 1. The difference only lies in that activated sludge after preliminary acclimating was used in the step of activated sludge pretreatment.

After the treatments, the PTA wastewater had a CODcr content of 450 mg/L, and a capture rate of carbon dioxide in the flue gas reached 71%. The microalgae in the reactor were replaced regularly and used for producing a fuel gas by pyrolysis.

Example 10

The wastewater used was the same as that in Example 1. The difference of treatment steps only lies in that ultraviolet light irradiation treatment by using ultraviolet light having a wavelength of 365 nm was not performed. That is, the wastewater was subjected to the activated sludge treatment (8 h) and the microalgae treatment (16 h). After the treatments, the PTA wastewater had a CODcr content of 780 mg/L, and a capture rate of carbon dioxide in the flue gas reached 85%. The microalgae in the reactor were replaced regularly and used for producing a fuel gas by pyrolysis.

Example 11

The wastewater used was the same as that in Example 1. The difference of treatment steps only lies in that microalgae treatment was not performed. That is, the wastewater was subjected to the ultraviolet light irradiation treatment and the activated sludge treatment. The ultraviolet light irradiation treatment lasted for 10 min, and the activated sludge treatment lasted for 23 h and 50 min.

After the treatments, the PTA wastewater had a CODcr content of 124 mg/L, and a capture rate of carbon dioxide in the flue gas was 0%.

Example 12

The wastewater used was the same as that in Example 1. The difference of treatment steps only lies in that the species of the microalgae used was different. In the present example, the species of the microalgae was Microcystis.

After the treatments, the PTA wastewater had a CODcr content of 205 mg/L, and a capture rate of carbon dioxide in the flue gas reached 70%. The microalgae in the reactor were replaced regularly and used for producing a fuel gas by pyrolysis.

Example 13

The difference between Example 13 and Example 1 lies in that: a time length of the ultraviolet light irradiation was extended to 80 min; a time length of activated sludge treatment was 8 h; and a time length of microalgae treatment was 15.5 h.

After the treatments, the PTA wastewater had a CODcr content of 135 mg/L, and a capture rate of carbon dioxide in the flue gas reached 91.2%. The microalgae in the reactor were replaced regularly and used for producing a fuel gas by pyrolysis.

Example 14

The difference between Example 14 and Example 1 lies in that: a time length of the ultraviolet light irradiation was 10 min; a time length of activated sludge treatment was 4 h; and a time length of microalgae treatment was 19 h and 50 min.

After the treatments, the PTA wastewater had a CODcr content of 92 mg/L, and a capture rate of carbon dioxide in the flue gas reached 95.4%. The microalgae in the reactor were replaced regularly and used for producing a fuel gas by pyrolysis.

Example 15

The difference between Example 15 and Example 1 lies in that: a time length of the ultraviolet light irradiation was 10 min; a time length of activated sludge treatment was 11 h and 55 min; and a time length of microalgae treatment was 11 h and 55 min.

After the treatments, the PTA wastewater had a CODcr content of 112 mg/L, and a capture rate of carbon dioxide in the flue gas reached 93.2%. The microalgae in the reactor were replaced regularly and used for producing a fuel gas by pyrolysis.

The invention claimed is:

1. A method for treatment and resource utilization of acidic organic wastewater, comprising the following steps of:
   (1) performing activated sludge treatment on acidic organic wastewater; and
   (2) performing microalgae treatment on the acidic organic wastewater treated in step (1),
   wherein the method further comprises performing ultraviolet irradiation treatment on the acidic organic wastewater before the activated sludge treatment,
   the acidic organic wastewater before the ultraviolet irradiation treatment has a CODcr content of 3000-30000 mg/L, and the acidic organic wastewater after the microalgae treatment has a CODcr content of less than 300 mg/L.

2. The method according to claim 1, wherein the acidic organic wastewater is terephthalic acid wastewater; and/or the acidic organic wastewater has a pH value of 1-5.

3. The method according to claim 1, wherein the activated sludge used in step (1) is acclimated activated sludge, wherein a method of acclimating the activated sludge comprises:
   a first acclimating stage, in which activated sludge used for treatment of municipal sewage is cultivated for 8 to 10 days with acidic wastewater having a CODcr content of 3000-5000 mg/L and a pH value of 1-5.

4. The method according to claim 3, wherein the method of acclimating the activated sludge further comprises a second acclimating stage after the first acclimating stage, wherein, at the second acclimating stage, acidic organic wastewater having a CODcr content of 6000-8000 mg/L, acidic organic wastewater having a CODcr content of 9000-15000 mg/L, and acidic organic wastewater having a CODcr content of 16000-30000 mg/L are used sequentially to cultivate the activated sludge after the first acclimating stage, and the cultivating time all ranges from 1 to 3 days.

5. The method according to claim 1, wherein microbes in the activated sludge comprise Chlorobia, a content of which accounts for more than 10% of the total amount of the microbes, wherein the percentage refers to bacterial abundance.

6. The method according to claim 1, wherein microbes in the activated sludge comprise Alphaproteobacteria, Sphingobacteriia, Betaproteobacteria, and Chlorobia, a total content of which accounts for more than 50% of the total amount of the microbes, wherein the percentage refers to bacterial abundance.

7. The method according to claim 6, wherein microbes in the activated sludge comprise Alphaproteobacteria in an amount ranging from 15% to 25%, Sphingobacteriia in an amount ranging from 10% to 15%, Betaproteobacteria in an amount ranging from 15% to 25%, and Chlorobia in an amount ranging from 20% to 25%, relative to the total amount of the microbes, wherein the percentage refers to bacterial abundance.

8. The method according to claim 1, wherein microbes in the activated sludge comprise Alphaproteobacteria, Sphingobacteriia, and Deinococci;
   wherein a total content of Alphaproteobacteria, Sphingobacteriia, and Deinococci accounts for more than 50% of the total amount of the microbes, wherein the percentage refers to bacterial abundance.

9. The method according to claim 1, wherein the time period of the activated sludge treatment ranges from 5 to 96 h; and/or the time of the microalgae treatment ranges from 5 to 240 h.

10. The method according to claim 1, wherein the microalgae used in the microalgae treatment are *Chlorella*; and, before the use, an acclimating treatment is performed on the microalgae in a photobiological device, wherein conditions of the acclimating treatment are cultivating for 10 to 16 days with acidic organic wastewater to be treated and meanwhile providing illumination with an illumination intensity ranging from 3000 to 4100 lux.

11. The method according to claim 1, wherein the time period of the ultraviolet irradiation treatment ranges from 4 to 500 min.

12. The method according to claim 1, further comprising using carbon dioxide in an industrial purge gas and/or in a biomass gas source as a carbon source for growth of the microalgae, and wherein the industrial purge gas is a flue gas, in which a content of carbon dioxide ranges from 8 to 15v %, relative to the total volume of the industrial purge gas.

13. The method according to claim 1, further comprising recycling microalgae used in the microalgae treatment as a biomass energy material for producing a biomass fuel gas by pyrolysis.

14. The method according to claim 3, wherein at the first acclimating stage, the cultivating temperature ranges from 20 to 28° C. and the dissolved oxygen content is controlled to be from 2 to 4 mg/L.

15. The method according to claim 4, wherein during the second acclimating stage, N and P nutrient substances are added, wherein the source of N nutrient substances is provided by carbamide; the source of P nutrient substances is provided by dipotassium phosphate; and a ratio of COD to N to P, based on element mass, is (95-102):(0.8-1.3):(0.7-1.2); and
   at the second acclimating stage, the cultivating temperatures all range from 20 to 28° C. and the dissolved oxygen content is controlled to be from 2 to 4 mg/L.

16. The method according to claim 5, wherein the microbes in the activated sludge comprise Chlorobia, a content of which accounts for 20%-25% of the total amount of the microbes, wherein the percentage refers to bacterial abundance.

17. The method according to claim 7, wherein the microbes in the activated sludge comprise Alphaproteobacteria in amount ranging from 20% to 22%, Sphingobacteriia in an amount ranging from 11% to 13%, Betaproteobacteria in an amount ranging from 18% to 21%, and Chlorobia in an amount ranging from 21% to 25%, relative to the total amount of the microbes, wherein the percentage refers to bacterial abundance.

18. The method according to claim 8, wherein the microbes in the activated sludge comprise Alphaproteobacteria in an amount ranging from 30% to 40%, Sphingobacteriia in an amount ranging from 20% to 25%, and Deinococci in an amount ranging from 8% to 12%, relative to the total amount of the microbes, wherein the percentage refers to bacterial abundance.

19. The method according to claim 9, wherein the time period of the activated sludge treatment ranges from 5 to 48 h; and/or the time of the microalgae treatment ranges from 12 to 36 h.

20. The method according to claim 11, wherein the time period of the ultraviolet irradiation treatment ranges from 5 to 60 min.

* * * * *